(12) United States Patent
Hoole

(10) Patent No.: US 8,385,967 B2
(45) Date of Patent: Feb. 26, 2013

(54) SYSTEMS AND METHODS FOR USAGE-BASED OUTPUT POWER LEVEL ADJUSTMENTS FOR SELF-OPTIMIZING RADIO ACCESS NODES

(75) Inventor: Elliott Hoole, Sammamish, WA (US)

(73) Assignee: Eden Rock Communications, LLC, Bothell, WA (US)

(\*) Notice: Subject to any disclaimer, the term of this patent is extended or adjusted under 35 U.S.C. 154(b) by 189 days.

(21) Appl. No.: 12/701,912

(22) Filed: Feb. 8, 2010

(65) Prior Publication Data

US 2010/0216485 A1 Aug. 26, 2010

Related U.S. Application Data

(60) Provisional application No. 61/155,112, filed on Feb. 24, 2009.

(51) Int. Cl.
*H04B 7/00* (2006.01)
(52) U.S. Cl. .............. 455/522; 455/453; 455/452.2
(58) Field of Classification Search .......... 455/453, 455/522
See application file for complete search history.

(56) References Cited

U.S. PATENT DOCUMENTS

| 6,597,922 B1 * | 7/2003 | Ling et al. ............. 455/522 |
| 6,748,234 B1 | 6/2004 | Agrawal et al. |
| 7,787,899 B1 * | 8/2010 | Talley et al. ............ 455/522 |
| 2001/0040880 A1 | 11/2001 | Chen et al. |
| 2007/0197251 A1 | 8/2007 | Das et al. |
| 2010/0151870 A1 * | 6/2010 | Piercy et al. ............ 455/450 |

FOREIGN PATENT DOCUMENTS

KR 10-0957345 B1 5/2010

OTHER PUBLICATIONS

International Search Report and Written Opinion for PCT/US10/23512 filed on Feb. 8, 2010.

\* cited by examiner

*Primary Examiner* — Vladimir Magloire

(57) ABSTRACT

A wireless base station and method are described for adjusting an output power level for self-optimizing radio access node. The base station monitors a link metric of a downlink traffic channel and records the measurements as historical link metric data. Later, the base station compares the link metric with the historical link metric data and adjusts the power level of a broadcast channel and one or more system channels. This may reduce the operating radius of the base station, including the broadcast channels, system channels, and traffic channels, to reduce interference with other cells in a network. This method may be used in a femtocell or picocell wireless base station.

19 Claims, 6 Drawing Sheets

SYSTEMS AND METHODS FOR USAGE-BASED OUTPUT POWER LEVEL ADJUSTMENTS FOR SELF-OPTIMIZING RADIO ACCESS NODES

CROSS REFERENCE To RELATED APPLICATIONS

The present application claims benefit of U.S. Provisional Application No. 61/155,112, filed Feb. 24, 2009.

FIELD OF THE INVENTION

The present invention generally relates to systems and methods of self-optimizing radio access nodes that adjust an output power level based on usage information. This optimization is intended to adjust the footprint of a radio access node in accordance with a historically required power level.

BACKGROUND OF THE INVENTION

Traditional wireless network topology may include macrocells and microcells, and increasingly networks may include picocells and femtocells. At the highest level, macrocells are cell sites covering a large physical area, often where traffic densities are low. In areas of increased traffic density, microcells are installed to add network capacity and to improve signal quality. Microcells are typically smaller than macrocells, hence the prefix designations indicating their relative size.

Each macrocell and microcell in a network was typically designed by radio engineers and communications experts to provide a specific cell radius, frequency, and/or power level, factoring in intended capacity and potential interference with other cells. Once a macrocell and microcell had been installed, its parameters were not modified except after careful observation and redesign by the aforementioned radio engineers and communications experts. Despite the extensive wireless network design, many users still find service inadequate at essential locations such as at a user's home or office.

Short-range wireless transceiver devices (e.g. femtocell and picocell device), operating on licensed frequency spectra, are now being deployed to improve the quality of wireless communications at various subscriber site locations. Often these short-range wireless transceiver devices are configured to connect with a particular service network using various common wireline technologies, i.e. a backhaul, including, but not limited to: fiber optic, DSL, powerline, and/or coaxial cable. These transceiver devices may be distributed in such a way as to provide short-range wireless communications services to single-family homes, public businesses (e.g., Starbucks® coffee shops or McDonalds® restaurants), to particular floors within an office building, etc. These short-range range wireless transceiver devices are often the final device in the wireless hierarchy to provide wireless communications to a small group of users.

Femtocells and picocells offer many benefits to both the user and to the network at large. Generally, adding short-range wireless transceiver devices with a backhaul connection helps reduce network loads experienced by macrocells or microcells. Use of a short-range wireless transceiver device may also decrease power consumption of a mobile device connected to the transceiver because the mobile device may transmit and receive at a lower power level. Finally, users may experience a benefit because the use of short-range wireless transceiver devices greatly reduces or eliminates any "dead spots," or areas of insufficient network coverage.

Expanding a network's resources to include short-range wireless alternatives in highly populated areas can significantly reduce periods of network congestion between various links in a larger data communications network. This can improve a service provider network's Quality of Service (QOS) as well as network service subscribers' collective Quality of Experience (QOE) within a particular portion of a data communications network. Negative effects associated with poor QOS and poor QOE (e.g., conditions largely caused by congestion and/or interference), which can be mitigated by adding a substantial amount of short-range wireless transceiver devices to network infrastructure, may include: queuing delay, data loss, as well as blocking of new and existing network connections for certain network subscribers.

Although adding a variety of short-range wireless communications transceivers to an existing network can improve network throughput in most metropolitan areas, the unplanned placement of these short-range transceiver devices (e.g., femtocell and/or picocell devices) within a given network topology can also have detrimental effects on wireless communications quality within a service provider network. In particular, joining or relocating transportable transceiver devices to the network may inadvertently cause interference amongst the transportable transceiver devices, neighboring base stations, and various user equipment of a wireless network based on existing deployments of network base stations (e.g., macrocell and/or microcell base stations).

Accordingly, without careful frequency and/or radio power level planning within particular regions of a data communications network, both short-range transceiver device and wide-range base station communications could suffer from detrimental interference scenarios. In some problematic scenarios, the interference may be associated with co-channel interference and in other scenarios the interference may be associated with adjacent channel interference. Typically, it is not possible for service providers to keep track of, or even properly plan for, the addition and/or relocation of hundreds or even thousands of transportable short-range transceiver devices residing within portions of a larger data communications network.

Next generation cellular networks (e.g., 3GPP LTE or 4G communications networks) may be able to take advantage of system redundancy associated with heterogeneous mixtures of short-range wireless transceiver devices collocated with wider-range network base stations. These new deployment topologies may result in robust mixtures of network cell coverage within regions of overlapping wireless service. In particular, many modern, low power transceiver devices (e.g., femtocell Home eNodeB devices) are readily transportable within a communications network by end users. This mobility creates the possibility that short-range transceiver devices may be moved to unpredictable locations where their operation could potentially produce substantial interference to surrounding network infrastructure, unless their maximum radio power levels were constrained to reduce unwanted instances of network interference.

Presently, there is a need for improved systems and methods that facilitate ad-hoc deployments of short-range wireless transceiver devices within larger wireless communications networks. It would be beneficial if these deployments could occur while ensuring that the operation of transportable transceiver devices will not interfere with or significantly degrade existing, overlapping network infrastructure (e.g., including static macrocell, microcell, and/or picocell base stations). To date, it has been very difficult for service providers to restrict portable transceiver devices to particular geographic locations (e.g., to lock a transceiver device to a subscriber's residence or place of business). Accordingly, it would also be desirable if these improved systems and methods could be managed by subscriber-deployed equipment (e.g., by transceiver devices that service providers deploy to their network subscribers). This distribution would advantageously affect quality optimization processes amongst a wireless network's resources, such that a particular service provider entity would not need to be independently responsible for impractical resource planning and management tasks, created by unexpected customer relocation and operation of short-range network communications equipment.

SUMMARY OF THE INVENTION

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

In overcoming the above disadvantages of the macrocell and microcell topology and in addressing the needs of the modern communication network, a self-optimizing radio access node and method of configuring the node includes, but is not limited to, a base station that adjusts its output power level based on usage data for that particular base station.

The present invention may include a computer implemented method for adjusting a power level of a base station, comprising: monitoring a downlink traffic channel of the base station, comparing a link metric of the monitored downlink traffic channel of the base station to historical link metric data of the downlink traffic channel; and adjusting a power level of a broadcast channel and one or more system channel of the base station based on the comparison according to a predetermined set of rules.

In accordance with another aspect of the present invention, the historical link metric data may be measurements of the link metric of the monitored downlink traffic channel to form a set of statistics for the downlink traffic channel of the base station.

In accordance with another aspect of the present invention, the method may include varying the power level of the broadcast channel and one or more system channel of the base station to reduce interference with a cell in a network.

In accordance with a further aspect of the present invention, the method may include tracking one or more link metric sent from a subscriber device to the base station.

In accordance with another aspect of the present invention the method may include recording a plurality of measurements of the link metric of the monitored downlink traffic channel as the historical link metric data of the downlink traffic channel.

In accordance with another aspect of the present invention, adjusting the power level of the broadcast channel and one or more system channel is performed automatically and dynamically after the base station is installed.

In accordance with another aspect of the present invention, the base station is a femtocell or picocell base station.

The present invention may further include a base station for wireless communication, comprising: a processor, a memory operatively coupled to the processor, and a radio-frequency circuit operatively coupled to the processor for sending and receiving data. The processor in the base station may further be configured to execute instruction steps for: receiving one or more link metric corresponding to downlink traffic channel data, comparing one or more one link metric corresponding to the downlink traffic channel data of the base station to historical link metric data of the downlink traffic channel, and adjusting a power level of a broadcast channel and one or more system channel of the base station based on the comparison according to a predetermined set of rules.

In accordance with another aspect of the present invention, the historical link metric data for the base station for wireless communication may be one or many measurements of the link metric of the downlink traffic channel to form a set of statistics for the downlink traffic channel of the base station.

In accordance with another aspect of the present invention, adjusting the broadcast channel and one or more system channel in the base station includes varying the power level of the broadcast channel and one or more system channel of the base station to reduce interference with a cell in a network.

In accordance with another aspect of the present invention, the base station receives one or more link metrics from a subscriber device.

In accordance with another aspect of the present invention, the base station records one or more measurements of the link metric as the historical link metric data of the downlink traffic channel.

In accordance with another aspect of the present invention, the base station adjusts the power level of the broadcast channel and one or more system channel automatically and dynamically after the base station is installed at a location of operation.

In accordance with a further aspect of the invention is a computer-readable medium encoded with computer-executable instructions for adjusting a power level of a base station, which when executed, performs a method comprising: monitoring a downlink traffic channel of the base station, comparing a link metric of the monitored downlink traffic channel of the base station to historical link metric data of the downlink traffic channel, and adjusting a power level of a broadcast channel and one or more system channel of the base station based on the comparison according to a predetermined set of rules.

BRIEF DESCRIPTION OF THE DRAWINGS

Preferred and alternative embodiments of the present invention are described in detail below by way of example and with reference to the drawings, in which.

DETAILED DESCRIPTION

Figure 1:
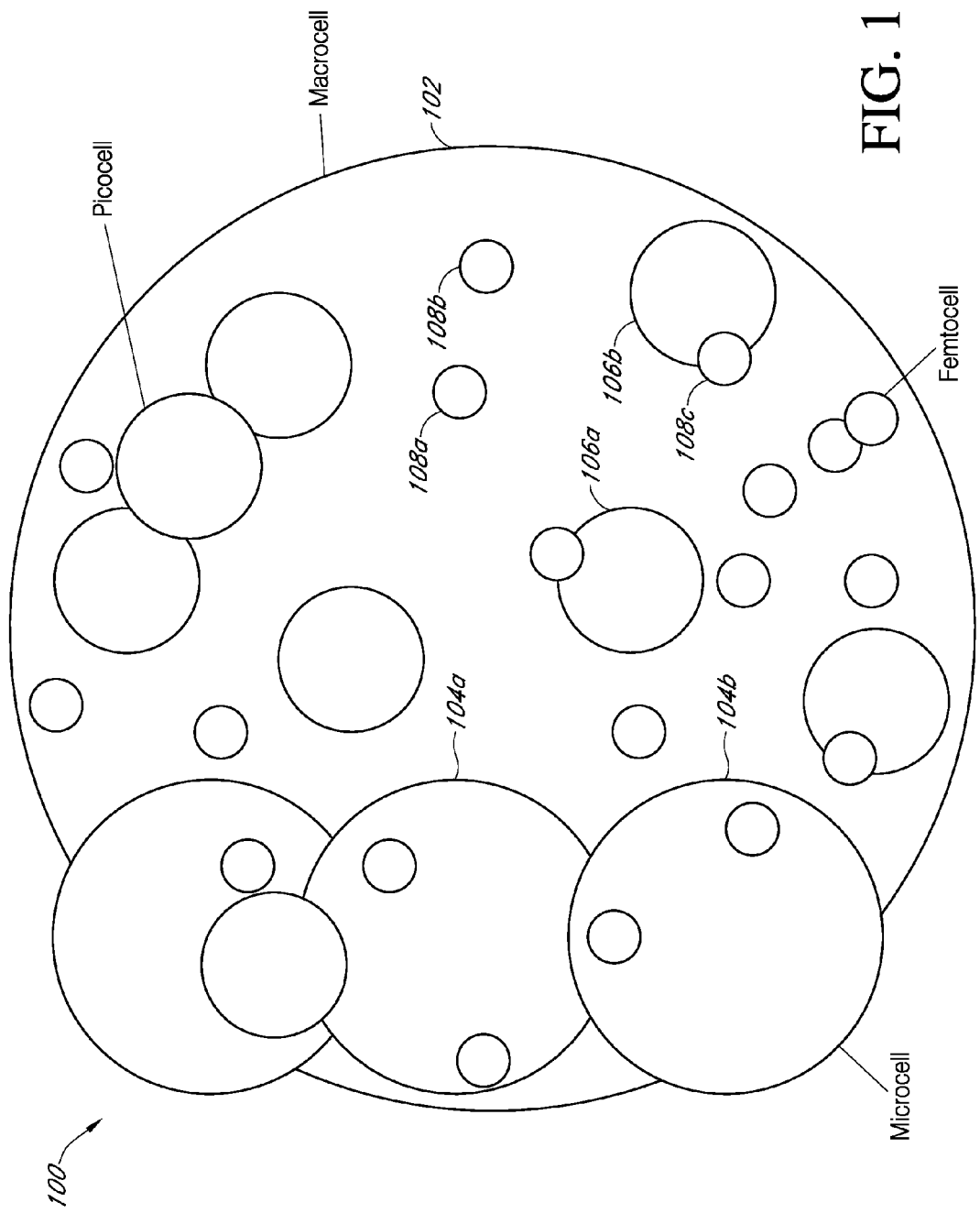
FIG. 1 illustrates macrocell, microcell, picocell, and femtocell coverage regions resulting from extemporaneous deployment methodology.

In accordance with an exemplary embodiment of the present invention, FIG. 1 illustrates a generic cell coverage topology 100 depicting cell coverage regions resulting from extemporaneous deployment methodology. The generic cell coverage topology 100 may include, but is not limited to, one or more macrocells 102 as the largest cell region covered by a base station. The footprint, or coverage area, of the macrocell 102 is typically determined by an engineer and does not vary once it is set.

As traffic density or the amount of obstructions increase, one or more microcells 104a and 104b may be installed in the same geographic coverage region as the macrocell 102. Alternatively, microcells 104a and 104b may be used in lieu of the macrocell 102. Microcells 104a and 104b are generally smaller than macrocell 102 and handle higher traffic densities. The location and coverage region of the microcells 104a and 104b are also determined by an engineer and do not vary once installed.

Picocells 106a and 106b, as well as femtocells 108a-c, provide more localized coverage for mobile devices in the generic cell coverage topology 100. A picocell 106a or 106b covers an area smaller than macrocell 102 and microcells 104a and 104b such as an airport, train station, convention hall, or shopping center, for example. Picocells 106a and 106b may be found inside buildings where coverage is poor or where the traffic density is particularly high. Femtocells 108a-c may cover an area even smaller than a picocell 106a or 106b such as a house, small building, or a floor of an office building, for example. Picocells 106a and 106b and femtocells 108a-c may be deployed in an ad-hoc manner and the coverage areas may vary dynamically in accordance with an embodiment of the invention. Generic cell coverage topology 100 is just one example of the possible configuration, and nearly infinite combinations of cell types and overlapping coverage areas can be imagined and implemented.

Figure 2:
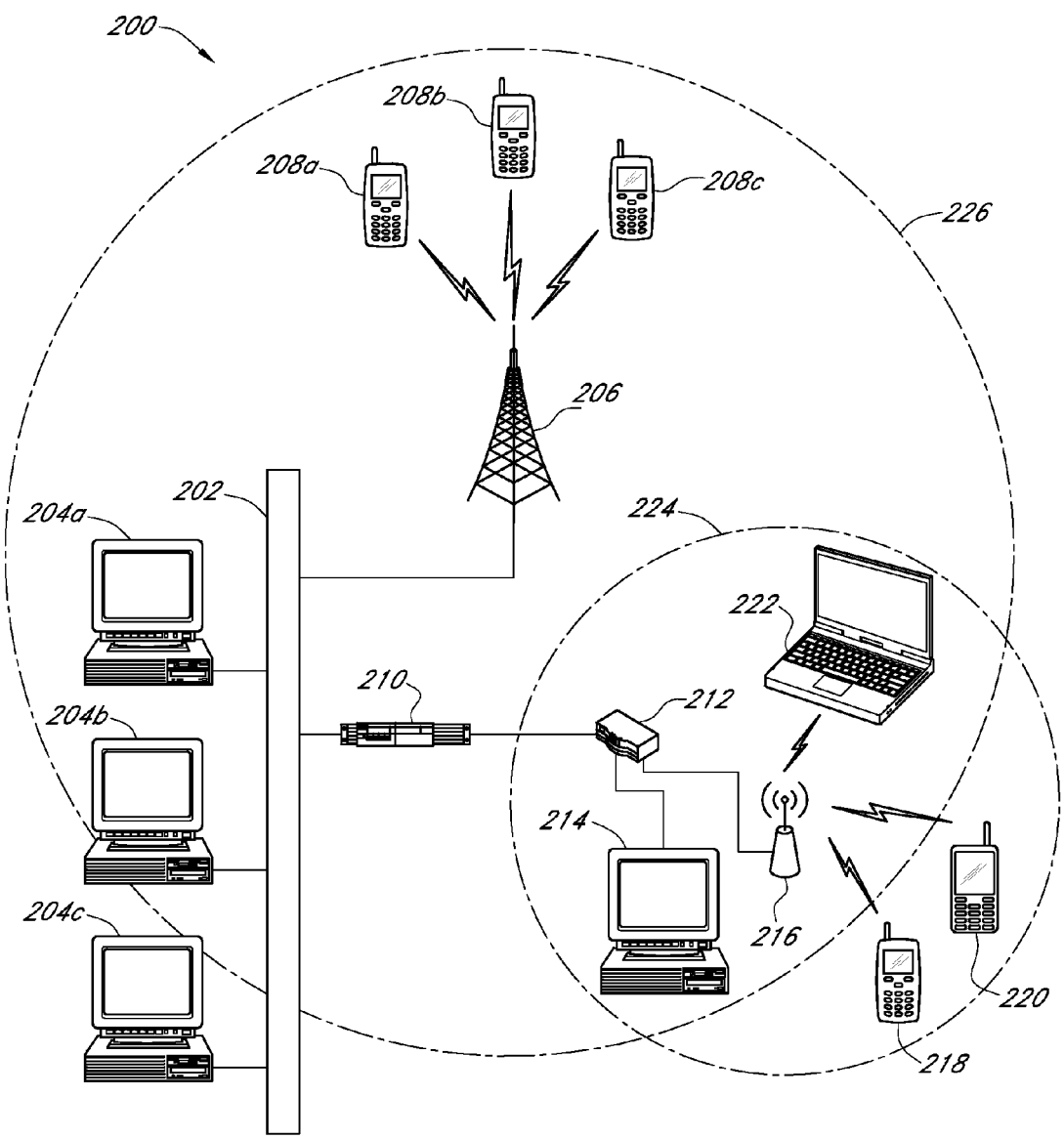
FIG. 2 illustrates a perspective view of a networked computing system in accordance with an embodiment of the present invention.

FIG. 2 illustrates a perspective view of a networked computing system 200 including various wireline and wireless computing devices that may be utilized to implement any of the usage-based optimization processes associated with various embodiments of the present invention. The networked computing system 200 may include, but is not limited to, one or more remote base station devices 206, which may be associated with a macrocell, a microcell, or a picocell base station that may be a neighboring base station to one or more short-range transceiver devices 216 (e.g., a femtocell or picocell device) within a particular region of the networked computing system 200; a group of remote service provider devices 204a-c, including server computers or any other common network device known in the art such as routers, gateways, or switch devices, which can support network resource allocation and/or digital data communication services to various network subscriber computing devices (e.g., any of the devices 208a-c, 210, 212, 214, 216, 218, 220, and 222); a data communications network 202, including both Wide Area Network 226 (WAN), and Local Area Network 224 (LAN) portions; a variety of wireless user equipment, including: cellular phone or PDA devices 208a-c, 218 and 220, and a laptop or netbook computer 222, along with any other common portable wireless computing devices well known in the art (e.g., handheld gaming units, personal music players, video recorders, electronic book devices, etc.) that are capable of communicating with the data communications network 202 utilizing one or more of the remote base stations 206, the short-range transceiver device 216, or any other common wireless or wireline network communications technology; one or more network gateways or switch devices 210 and router 212 that can facilitate data communications processes within the LAN and between the LAN and the WAN of the data communications network 202; and a desktop computer 214 optionally connected to the LAN.

In an embodiment, the remote base station 206, the short-range transceiver device 216 (e.g., a femtocell or picocell base station), the remote service provider devices 204a-c, or any of the user equipment (e.g., 208a-c, 214, 218, 220, or 222) may be configured to run any well-known operating system, including, but not limited to: Microsoft® Windows®, Mac OS®, Google® Chrome®, Linux®, Unix®, or any well-known mobile operating system, including Symbian®, Palm®, Windows Mobile®, Google® Android®, Mobile Linux®, MXI®, etc. In an embodiment, the remote base station 206 may employ any number of common server, desktop, laptop, and personal computing devices.

In an embodiment, the user equipment (e.g., 208a-c, 214, 218, 220, or 222) may include any combination of common mobile computing devices (e.g., laptop computers, netbook computers, cellular phones, PDAs, handheld gaming units, electronic book devices, personal music players, MiFi™ devices, video recorders, etc.), having wireless communications capabilities employing any common wireless data commutations technology, including, but not limited to: GSM™, UMTS™, LTE™, LTE Advanced™, Wi-Max™, Wi-Fi™, etc.

In an embodiment, either of the LAN or the WAN portions of the data communications network 202 of FIG. 2 may employ, but are not limited to, any of the following common communications technologies: optical fiber, coaxial cable, twisted pair cable, Ethernet cable, and powerline cable, along with any wireless communication technology known in the art. In an embodiment, the remote wireless base station 206, the wireless user equipment (e.g., 208a-c, 218, 220, or 222), as well as any of the other LAN connected computing devices (e.g., 210, 212, or 214) may include any standard computing software and hardware necessary for processing, storing, and communicating data amongst each other within the networked computing system 200. The computing hardware realized by any of the network computing system 200 devices (e.g., 204a-c, 206, 208a-c, 210, 212, 214, 216, 220, or 222) may include, but is not limited to: one or more processors, volatile and non-volatile memories, user interfaces, transcoders, and wireline and/or wireless communications transceivers, etc.

Further, any of the networked computing system 200 devices (e.g., 204a-c, 206, 208a-c, 210, 212, 214, 216, 220, or 222) may be configured to include one or more computer-readable media (e.g., any common volatile or non-volatile memory type) encoded with a set of computer readable instructions, which when executed, performs a portion of any of the usage-based optimization processes associated with various embodiments of the present invention.

In accordance with various embodiments of the present invention, a wide-area or wide-range base station may be considered to be any of a macrocell, a microcell, or a picocell base station, depending on the reference coverage area provided by the small-area or short-range wireless transceiver device(s) (e.g., a femtocell or a picocell device) to which the base station coverage area is being compared. Similarly, in accordance with various embodiments of the present invention, a small-area or short-range wireless transceiver device may be considered to be either a femtocell (e.g., a short-range base station device such as a Home eNodeB) or a picocell device, depending on the reference coverage area provided by neighboring wider coverage area base stations (e.g., macrocell, microcell, or picocell base stations) to which the transceiver device coverage area is being compared.

In an embodiment, user equipment 208a-c, 218, 220, and 222 may simultaneously reside within the wireless communications coverage area 224 of the short-range transceiver device 216 as well as within the wireless communications coverage area 226 of the base station 206, or the user equipment may reside in a single, non-overlapping area of LAN 224 or WAN 226.

Figure 3:
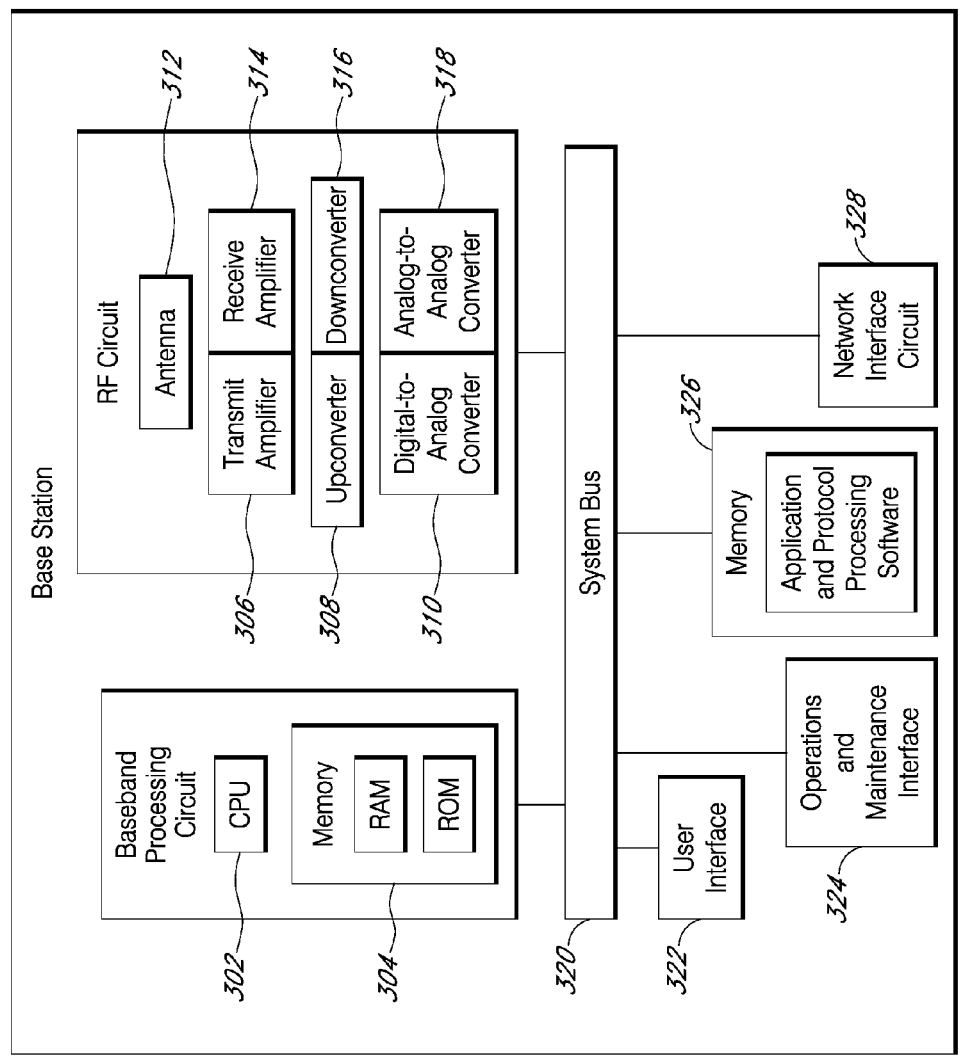
FIG. 3 illustrates a block diagram view of a base station in accordance with an embodiment of the present invention.

FIG. 3 illustrates a block diagram view of a base station device 300 (e.g., a femtocell or a picocell device) that may be representative of the short-range transceiver device 216 in FIG. 2. In accordance with an embodiment of the present invention, the base station device 300 and 216 may include, but is not limited to, a baseband processing circuit including a central processing unit (CPU) 302. In an embodiment, the CPU 302 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 302 is responsible for executing all computer programs stored on the transceiver device's 300 volatile (RAM) and nonvolatile (ROM) system memories, 304 and 326.

The base station device 300 may also include, but is not limited to, a radio frequency (RF) circuit for transmitting and receiving data to and from the network. The RF circuit may include, but is not limited to, a transmit path including a digital-to-analog converter 310 for converting digital signals from the system bus 320 into analog signals to be transmitted, an upconverter 308 for setting the frequency of the analog signal, and a transmit amplifier 306 for amplifying analog signals to be sent to the antenna 312. The RF circuit may also include, but is not limited to, a receive path including the receive amplifier 314 for amplifying the signals received by the antenna 312, a downconverter 316 for reducing the frequency of the received signals, and an analog-to-digital converter 318 for outputting the received signals onto the system bus 320. The system bus 320 facilitates data communication amongst all the hardware resources of the base station device 300.

Further, the base station device 300 may also include, but is not limited to a user interface 322; operations and maintenance interface 324; memory 326 storing application and protocol processing software; and a network interface circuit 328 facilitating communication across the LAN and/or WAN portions of the data communications network 202 (i.e., a backhaul network).

Figure 4:
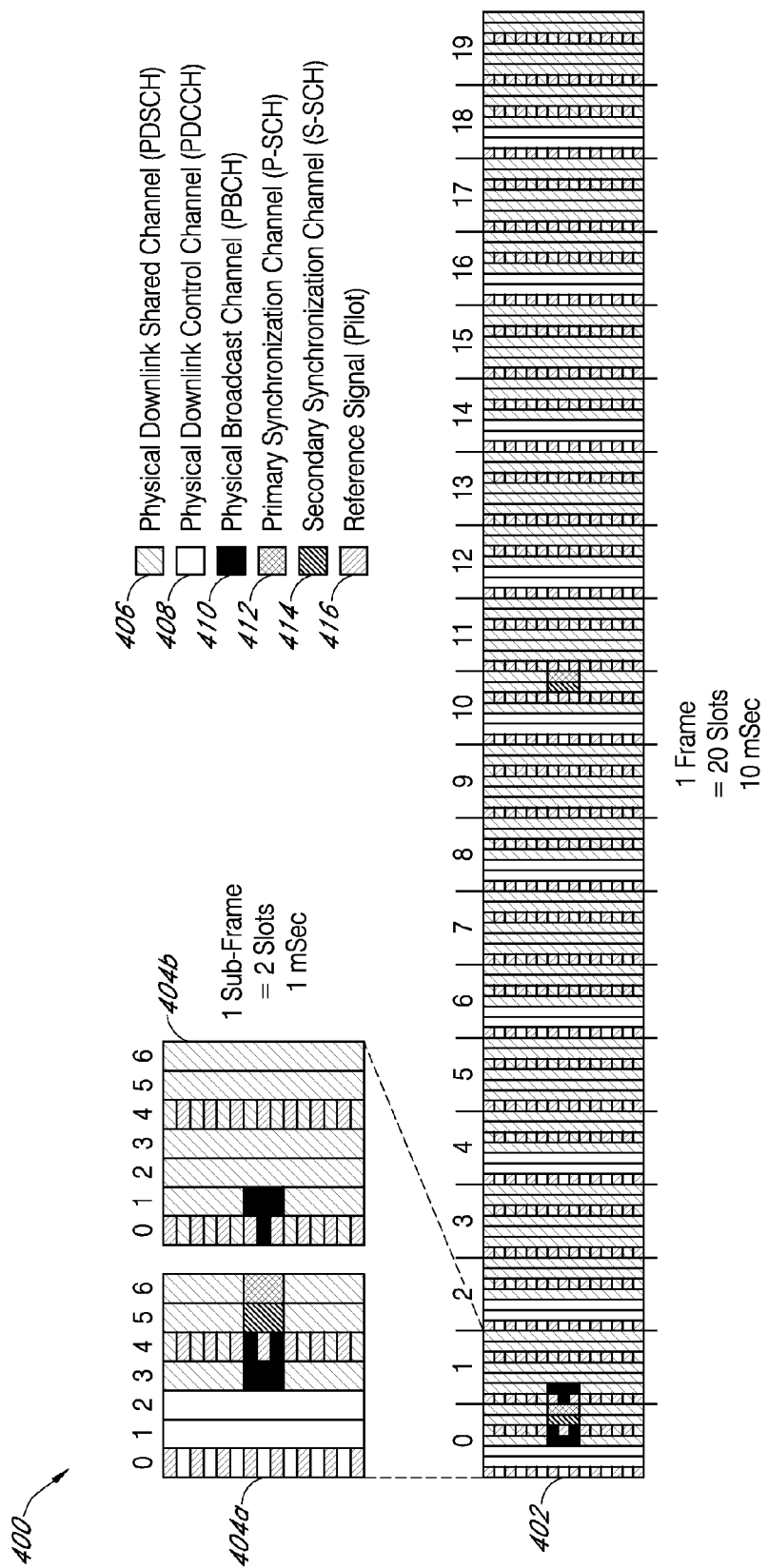
FIG. 4 illustrates a downlink traffic channel used by an embodiment of the present invention.

FIG. 4 illustrates generally a downlink traffic channel 400 used by an embodiment of the present invention. More specifically, FIG. 4 represents a time domain representation of orthogonal frequency-division multiplexing (OFDM) resources for a 3GPP LTE ($3^{rd}$ Generation Partnership Project Long Term Evolution) downlink channel. The downlink traffic channel 400 is comprised of several channels combined to form a downlink transmission from a base station 300 to a subscriber device (e.g., 208a-c, 218, 220, 222). One frame 402 of the downlink traffic channel 400 is comprised of 20 slots numbered 0-19, each slot comprising 0.5 mSec of transmission time. One slot of frame 402 can be referenced as slot 402.0, 402.1, . . . , 402.19. Each frame 402 is comprised of 10 sub-frames, an example of which is seen as a first slot 404a and a second slot 404b. Slots 404a and 404b collectively form a single sub-frame of the frame 402. Slots 404a and 404b are further divided into OFDM symbols which are serial in time. These OFDM symbols are numbered 0-6, respectively, for each slot 404a and 404b, while each symbol in each slot can be reference as 404a.0, 404a.1, . . . , 404a.6 and 404b.0, 404b.1, . . . , 404b.6. The vertical dimension of a symbol represents a frequency spectrum.

By way of example, the downlink traffic channel 400 uses six different channels to send data. The physical downlink shared channel (PDSCH) 406 may be used to send common user data and control information (e.g., paging messages) to subscriber devices operating within the coverage area of the base station 300. The physical downlink control channel (PDCCH) 408 is a transmission channel that may be used to transfer control information to mobile devices. The PDCCH 408 defines how the PDSCH 406 is configured and defines uplink transmission scheduling information to help coordinate access control to the base station 300. The PDCCH 408 is usually transmitted as the first symbol of a slot, e.g. symbol 404a.0 of slot 404a, and symbol 404b.0 of slot 404b. Next, the physical broadcast channel (PBCH) 410 is a transmission channel that may be used to transfer information to subscriber devices that are operating within the coverage area of the base station 300. The PBCH 410 may periodically send system identification and access control parameters. The primary synchronization channel (P-SCH) 412 and the secondary synchronization channel (S-SCH) 414 may be used to inform subscriber devices of the current cell timing and scrambling code. The reference signal (Pilot) 416 may carry the cell identity. For the purpose of this disclosure, the PDSCH 406 and PDCCH 408 may be considered traffic channels, the PBCH 410 may be considered a broadcast channel and/or a system channel, and the P-SCH 412 and the S-SCH 414 may be considered system channels. The reference signal 416 may be considered to be a system channel and/or a reference channel.

In according with an embodiment of the present invention, the base station 300 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.). Additionally, the base station 300 may be configured to communicate with the subscriber devices (e.g., 208a-c, 218, 220, and 222) via any Cellular Data Communications Protocol, including any common GSM, UMTS, WiMAX or LTE protocol.

Next, the operation of the system is described generally and then by way of example. Initially, the RF circuit of FIG. 3 begins operation at an initial maximum transmit power level. In an alternate embodiment, the base station may operate at a power level set through the operations and maintenance interface 324 via an embedded web server, for example. The base station 300 establishes a connection with a subscriber device (e.g., 208a-c, 218, 220, and 222) and begins transmitting and receiving data. Before the base station adjusts the power level of the broadcast channel 410 and one or more system channels 412, 414, and 416 according to an embodiment of the present invention, the broadcast and other system channels (i.e., reference channels) will operate at this set power level. As the base station 300 and a subscriber device transmits and receives data, the subscriber device (e.g., 208a-c, 218, 220, and 222) monitors a link metric (e.g., signal strength and/or signal quality) of the downlink traffic channel 400. This information is received by the base station 300 and the power levels of the individual traffic channels 406 and 408 are set according to the link metrics.

As the base station 300 receives and monitors link metrics from a subscriber device (e.g., 208a-c, 218, 220, and 222), the base station 300 may record the measurements into a memory 304 or 326 of the base station 300. By recording these link metrics, the base station 300 builds up a statistically significant historical dataset based on the link metrics of the downlink traffic channel 400. If there is enough historical data, the base station 300 may compare an instantaneous link metric with the historical link metric data of the downlink traffic channel. The base station 300 uses a predetermined set of rules to compare the instantaneous link metric with the historical link metric data to determine if any adjustment is to be performed. If the predetermined rules are satisfied, the power level of the broadcast channel 410 and one or more system channels 412, 414, and 416 are adjusted.

By way of example, the transmit power for a base station 300 can be set at +21 dBm (i.e., the power level ratio in decibels (dB) if the measured power is referenced to one milliwatt (mW)). The broadcast channel 410 of the base station 300 will be transmitted by the RF circuit at this power level to establish the radius of operation (e.g., 224) inside which subscriber devices (e.g., 208*a-c*, 218, 220, and 222) will receive the downlink signal 400 from the base station 300. This operating radius could be on the order of 75 meters, for example, depending on the propagation characteristics of the coverage region. However, the base station 300 may be installed in a user's home and the user might generally stay within a smaller operating radius corresponding to the dimensions of the home. If the subscriber devices (e.g., 208*a-c*, 218, 220, and 222) are within 10 meters of the base station 300, then the required power levels for the traffic channels 406 and 408 will be much less than the +21 dBm used for the system channels. The subscriber device (e.g., 208*a-c*, 218, 220, and 222) sends link metrics to the base station 300 where the link metrics are used by a power control algorithm to control the power level of the traffic channels 406 and 408 used for transmitting data to the subscriber device (e.g., 208*a-c*, 218, 220, and 222). For example, the baseband processing circuit may reduce the power level of the traffic channels 406 and 408 until a desired signal-to-interference-plus-noise (SINR) level, e.g. 10 dB, is reached at the subscriber device.

After the power level of the traffic channels 406 and 408 are adjusted, the power level of the traffic channels 406 and 408 may be significantly different from the maximum transmit power level used for the broadcast channel 410 and the system channels 412, 414, and 416. As time passes and the subscriber device (e.g., 208*a-c*, 218, 220, and 222) monitors link metrics and sends the link metrics to the base station 300, the base station 300 records the link metrics as historical link metric data. Next, the base station 300 may compare the instantaneous link metric and/or the current operating power level of the traffic channels 406 and 408 against the historical link metric data and determine the instantaneous link metric and/or traffic channel 406 and 408 power levels are out of range of the historical link metric data. One example of an acceptable range (i.e., a predetermined set of rules) could be that the power level of the traffic channels 406 and 408 should be 3 dB above the historical power level for 16 QAM modulation. The base station 300 may compare the power level of the traffic channels 406 and 408 with the historical average transmit power level of 16 QAM traffic channels and determine there is a 10 dB difference; subsequently the base station 300 would begin decreasing the power level of the traffic channels 406 and 408 in accordance with the predetermined rule of a 3 dB difference. By decreasing the power level of the broadcast channel 410 and one or more system channels 412, 414, and 416, the coverage area of the base station is reduced, thereby reducing potential interference with a neighboring or overlapping cell in a network. Although this method was described in terms of decreasing power levels, the method will also increase the power level if a link metric falls below an established value.

In accordance with an embodiment of the present invention, a predetermined set of rules for adjusting the power level of the broadcast channel 410 and one or system channels 412, 414, and 416 may additionally be based on: device type; time of the day, day of the week, etc.; type of modulation used; and/or the number of subscriber devices connected to base station 300. This operation may occur automatically and dynamically without user intervention at any time unit or event interval.

Additionally, in accordance with an embodiment of the present invention, a link metric may include, but is not limited to: signal strength; signal quality; transmit power of the traffic channels 406 and 408; latency; interference levels; etc.

Figure 5:
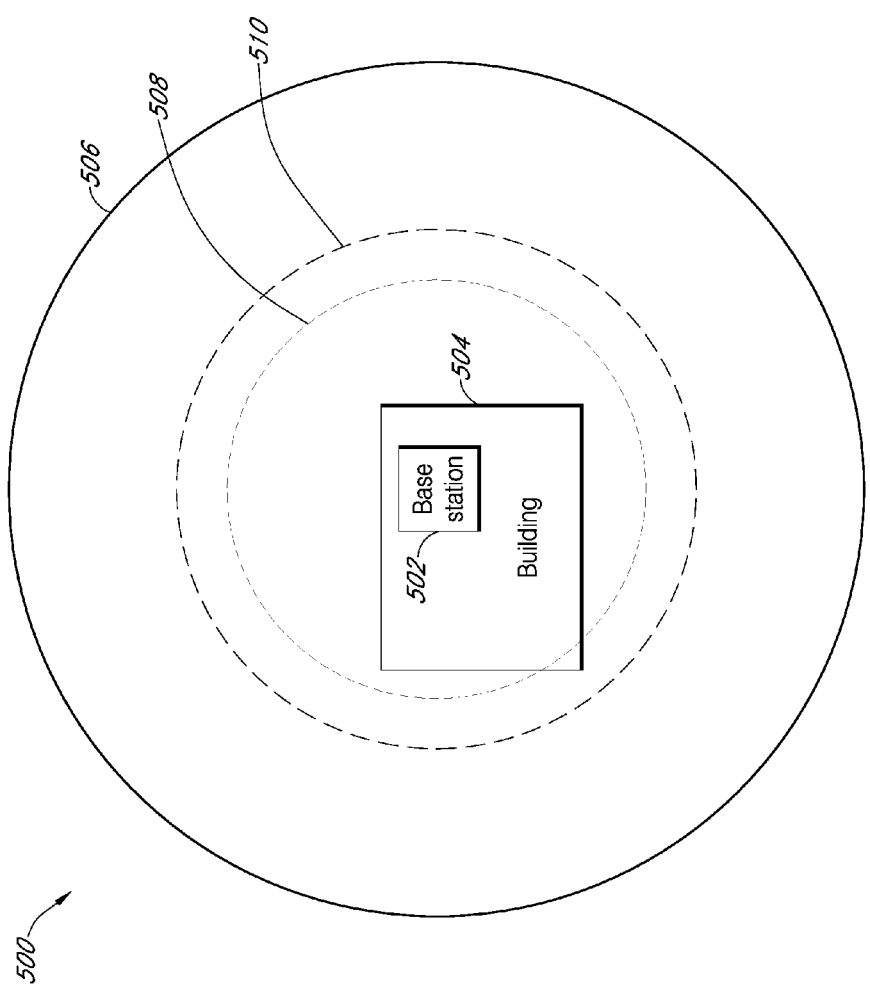
FIG. 5 illustrates a perspective view of the wireless coverage area of a base station in accordance with an embodiment of the present invention.

FIG. 5 illustrates a perspective view of the wireless coverage area 500 of a base station (e.g., femtocell or picocell device) in accordance with an embodiment of the present invention. Base station 502 may correspond to a base station 300 and 216 described earlier in the disclosure. In this embodiment, base station 502 is installed by a user in a building 504 by simply plugging the base station into a power supply and a backhaul network (e.g., 202). The base station 502 may perform an automated configuration process and begin transmitting at a maximum baseline power level. The operating radius of the base station 502 corresponding to this maximum baseline power level is indicated by the baseline footprint 506. In an embodiment of the invention, this baseline footprint 506 corresponds to the operating radius of the broadcast channel 410 and system channels 412, 414, and 416 of the base station. A user may primarily use a subscriber device (e.g., 208*a-c*, 218, 220, and 222) within the perimeter of the building 504. Over time, link metrics sent by the subscriber device (e.g., 208*a-c*, 218, 220, and 222) to the base station will be recorded as historical link metric data, which may correspond to a historical power level of the traffic channels. The historical operating radius of the base station required to maintain a connection with a subscriber device is shown as historical footprint 508. The base station will adjust the power level of the broadcast channel 410 and one or more system channels 412, 414, and 416 according to a predetermined set or rules. The operating radius of the base station after the power levels have been adjusted is shown as the adjusted footprint 510. In this example, the adjusted footprint 510 is slightly larger than the historical footprint 508 to provide an extra margin for a subscriber device to roam beyond the historical operating distance and/or for the user to operate outside of the historical operating paramters. In an alternate embodiment, the baseline power level may be a minimum power level and the system would adjust the power levels from that initial point.

Figure 6:
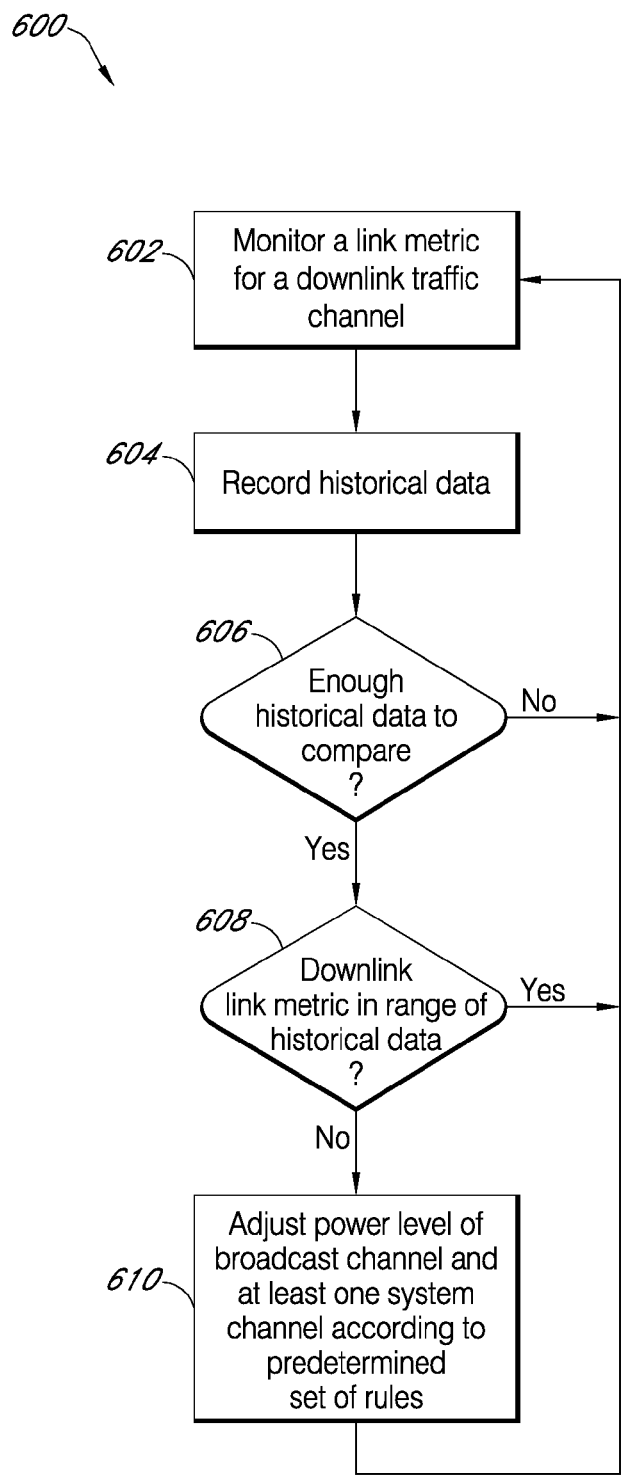
FIG. 6 illustrates a flow diagram depicting processes for adjusting the power level of a base station in accordance with an embodiment of the present invention.

FIG. 6 illustrates a flow diagram 600 depicting base station 300 power level optimization processes associated with an embodiment of the present invention. It should be understood that this process 600 could be executed using one or more computer-executable programs stored on one or more computer-readable media located on any one of the network computing system's 200 base station devices 216, 300, and 502, or collaboratively on the network base station 206, the group of remote service provider devices 204*a-c*, or on any other common service provider device known in the Art of FIGS. 1-3. At block 602, a link metric for a downlink traffic channel is monitored. This monitoring step may be performed at a subscriber device (e.g., 208*a-c*, 218, 220, and 222) or at the base station (e.g., 216, 300, and 502). Additional steps in the monitoring process may include sending the monitored link metric data to the base station (e.g., 216, 300, and 502) from the subscriber device (e.g., 208*a-c*, 218, 220, and 222), tracking the link metric at the base station 300, and/or receiving the link metric data at the base station (e.g., 216, 300, and 502). Next, at block 604, the link metric data for a downlink traffic channel is recorded as historical data.

Then, at block 606 it is determined if there is enough historical data to compare the instantaneous downlink link metric against. If it is determined that more data is required to form the historical data, the process returns to block 602 where the link metric is monitored again. However, if it is determined that there is enough historical data to compare against an instantaneous link metric, the process proceeds to block 608. In an embodiment of the present invention, a monitored link metric may be a downlink channel power level (e.g., either the broadcast or received power level), and/or downlink channel signal-to-noise ratio or signal-to-interference-plus-noise (SINR) level. Historical data may be a running historical average of the power levels or signal-to-noise ratios or SINR levels.

At block 608 the downlink link metric is compared against the historical data. If the downlink link metric is within range of the historical data (e.g., according to a set of operating rules), the process exits block 608 and returns to block 602 to continue the monitoring process. However, if the downlink link metric is not within the range of the historical data, according to a set of operating rules, the process moves to block 608. One such operating rule, for example, could be that the maximum transmitting power level for the downlink traffic channel should be no more than 3 dB above the historical traffic channel power level for 16 QAM modulation. If the difference between the instantaneous transmitting power level and the historical power level is above 3 dB, the link metric is not within range (block 608) and the process moves to block 608.

At block 608 the base station adjusts the power level of the broadcast channel 410 and one or more system channels 412, 414, and 416 according to a set of predetermined rules. For example, if the broadcast channel 410 power level is set at its maximum value (e.g., 506) and the historical power level required by normal operation is much lower (e.g., 508), the base station 300 reduces the power level to reduce the operating radius of the base station (e.g., 510). This change could be made in a linear fashion over time or in non-linear steps to increase convergence. Once the base station 300 has finished adjusting the power level of the broadcast channel 410 and one or more system channels 412, 414, and 416 in block 608, the process returns to block 602 and the process begins again.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

What is claimed is:

1. A computer implemented method for adjusting a power level of a base station, comprising:
   receiving at the base station a first signal strength information from a first subscriber device, the first signal strength information relating to power of a signal received by the first subscriber device via a first downlink traffic channel of the base station;
   maintaining historical signal strength data based on signal strength information received from one or more subscriber devices;
   determining whether or not there is a threshold amount of information stored in the historical signal strength data;
   adjusting a power level of a broadcast channel and at least one system channel of the base station based on the first signal strength information received from the first subscriber device and the historical signal strength data; and
   recording the first signal strength information as part of the historical signal strength data without performing the adjusting step if it is determined that there is not the said threshold amount of information stored in the historical signal strength data,
   wherein the adjusting step is performed only if it is determined that there is the said threshold amount of information stored in the historical signal strength data.

2. The method of claim 1, wherein the adjusting further comprises varying the power level of the broadcast channel and the at least one system channel of the base station to reduce interference with a cell in a network.

3. The method of claim 1, wherein adjusting the power level of the broadcast channel and the at least one system channel is performed automatically and dynamically after the base station is installed.

4. The method of claim 1, wherein the base station is a femtocell base station.

5. A base station for wireless communication, comprising:
   at least one processor;
   a memory operatively coupled to the processor; and
   a radio-frequency circuit operatively coupled to the processor for sending and receiving data,
   wherein the at least one processor executes instruction steps for:
   receiving at the base station a first signal strength information from a first subscriber device, the first signal strength information relating to power of a signal received by the first subscriber device via a first downlink traffic channel of the base station;
   determining whether or not there is a threshold amount of information stored in historical signal strength data, the historical signal strength data being accumulated data of signal strength information received from one or more subscriber devices;
   adjusting a power level of a broadcast channel and at least one system channel of the base station based on the first signal strength information received from the first subscriber device and the historical signal strength data;
   recording the first signal strength information as part of the historical signal strength data without performing the adjusting step if it is determined that there is not the said threshold amount of information stored in the historical signal strength data,
   wherein the adjusting step is performed only if it is determined that there is the said threshold amount of information stored in the historical signal strength data.

6. The base station for wireless communication of claim 5, wherein the adjusting further comprises varying the power level of the broadcast channel and the at least one system channel of the base station to reduce interference with a cell in a network.

7. The base station for wireless communication of claim 5, wherein adjusting the power level of the broadcast channel and the at least one system channel is performed automatically and dynamically after the base station is installed at a location of operation.

8. The base station for wireless communication of claim 5, wherein the base station is a femtocell base station.

9. The method of claim 1, further comprising: recording the first signal strength information as part of the historical signal strength data if it is determined that there is a threshold amount of information stored in the historical signal strength data;
   receiving at the base station a second signal strength information of a second downlink traffic channel of the base station from a second subscriber device, the second signal strength information relating to power of a signal received by the second subscriber device via a second downlink traffic channel of the base station; and adjusting a power level of the broadcast channel and at least one system channel of the base station based on the second signal strength information received from the second subscriber device and the historical signal strength data.

10. The method of claim 9, wherein the first and second subscriber devices are different devices.

11. The method of claim 1, wherein the historical signal strength data is maintained at the base station.

12. The method of claim 1, the adjusting step is performed based on a comparison between the first signal strength information received from the first subscriber device and the historical signal strength data.

13. The base station of claim 5, wherein the at least one processor further executes instruction steps for:

recording the first signal strength information as part of the historical signal strength data.

14. The base station of claim 5, wherein the at least one processor further executes instruction steps for:

recording the first signal strength information as part of the historical signal strength data if it is determined that there is an insufficient amount of information stored in the historical signal strength data; and determining whether or not there is a sufficient amount of information stored in the historical signal strength data after the first link metric has been recorded as part of the historical signal strength data.

15. The base station of claim 5, wherein the at least one processor further executes instruction steps for:

recording the first signal strength information as part of the historical signal strength data;

receiving at the base station a second signal strength information of a second downlink traffic channel of the base station from a second subscriber device, the second signal strength information relating to power of a signal received by the second subscriber device via a second downlink traffic channel of the base station; and adjusting a power level of the broadcast channel and at least one system channel of the base station based on the second signal strength information received from the second subscriber device and the historical signal strength data.

16. The method of claim 15, wherein the first and second subscriber devices are different devices.

17. The method of claim 5, wherein the historical signal strength data is maintained at the base station.

18. A computer implemented method for adjusting a power level of a base station, comprising:

receiving at the base station a first signal strength information from a first subscriber device, the first signal strength information relating to power of a signal received by the first subscriber device via a first downlink traffic channel of the base station;

maintaining historical signal strength data based on signal strength information received from one or more subscriber devices; and adjusting a power level of a broadcast channel and at least one system channel of the base station based on the first signal strength information received from the first subscriber device and the historical signal strength data; and recording the first signal strength information as part of the historical signal strength data without performing the adjusting step if it is determined that there is not a threshold amount of information stored in the historical signal strength data;

receiving at the base station a second signal strength information of a second downlink traffic channel of the base station from a second subscriber device, the second signal strength information relating to power of a signal received by the second subscriber device via a second downlink traffic channel of the base station; and adjusting a power level of the broadcast channel and at least one system channel of the base station based on the second signal strength information received from the second subscriber device and the historical signal strength data.

19. The computer implemented method of claim 18, wherein the adjusting step is performed only if it is determined that there is a threshold amount of information stored in the historical signal strength data.

* * * * *